US010383463B2

(12) United States Patent
Korn

(10) Patent No.: US 10,383,463 B2
(45) Date of Patent: Aug. 20, 2019

(54) METHODS FOR IMPROVING STRAIGHTNESS IN THE VERTICAL PLANE OF RETRACTABLE SCREEN PARTITIONS

(71) Applicant: Korn Wall Ltd, London (GB)

(72) Inventor: Michael Korn, London (GB)

(73) Assignee: KORN WALL LTD, London (GB)

( * ) Notice: Subject to any disclaimer, the term of this patent is extended or adjusted under 35 U.S.C. 154(b) by 247 days.

(21) Appl. No.: 15/591,620

(22) Filed: May 10, 2017

(65) Prior Publication Data

US 2017/0325605 A1    Nov. 16, 2017

(30) Foreign Application Priority Data

May 10, 2016    (GB) .................................... 1608169.7

(51) Int. Cl.
*A47G 5/02*    (2006.01)
*E06B 9/08*    (2006.01)
*E06B 9/42*    (2006.01)
*G03B 21/58*    (2014.01)

(52) U.S. Cl.
CPC .................. *A47G 5/02* (2013.01); *E06B 9/08* (2013.01); *E06B 9/42* (2013.01); *G03B 21/58* (2013.01)

(58) Field of Classification Search
CPC .... A47G 5/02; E06B 9/08; E06B 9/42; G03B 21/58
USPC ........................ 160/264, 263, 172 R, 24, 351
See application file for complete search history.

(56) References Cited

U.S. PATENT DOCUMENTS

| 1,800,627 | A | * | 4/1931 | Heck | G03B 21/58 160/24 |
| 2,425,466 | A | * | 8/1947 | Gregory | A61G 12/00 135/120.2 |
| 2,911,038 | A | * | 11/1959 | Frommelt | A61F 9/06 160/351 |
| 3,144,899 | A | * | 8/1964 | Stewart | G03B 21/58 160/24 |
| 3,220,464 | A | * | 11/1965 | Wise | G03B 21/58 160/24 |
| 4,102,381 | A | * | 7/1978 | Bratschi | E06B 9/36 160/168.1 R |
| 4,121,645 | A | * | 10/1978 | Behr | A47G 5/00 16/365 |

(Continued)

FOREIGN PATENT DOCUMENTS

| WO | 8808620 | 11/1988 |
| WO | 9735706 | 10/1997 |
| WO | 2010109247 | 9/2010 |

OTHER PUBLICATIONS

Combined Search and Examination Report of application No. GB1608169.7, dated Nov. 10, 2016, 10 pages.

*Primary Examiner* — Jose V Chen
(74) *Attorney, Agent, or Firm* — Hamre, Schumann, Mueller & Larson, P.C.

(57) ABSTRACT

Improvements in the straightness in the vertical plane of a screen panel attached within a rectangular frame structure employing split tubes as its top and bottom edges/struts are described. Areas permitting the straightness of the screen panel to be improved include zip attachment of the screen panel to the split tubes, dependence of teeth orientation, reinforcement of the frame structure using struts, clamping of the split tubes to the frame, and modification of the screen panel, individually or in any combination thereof.

18 Claims, 5 Drawing Sheets

(56) References Cited

U.S. PATENT DOCUMENTS

| | | | | |
|---|---|---|---|---|
| 4,825,921 A * | 5/1989 | Rigter | ............... | E06B 9/54 |
| | | | | 160/23.1 |
| 5,273,096 A * | 12/1993 | Thomsen | ............... | E06B 9/262 |
| | | | | 160/264 |
| D415,901 S * | 11/1999 | Arko | ............... | D6/332 |
| D420,223 S * | 2/2000 | Chipman | ............... | D6/332 |
| 6,286,579 B1 * | 9/2001 | Gottschalk | ............... | E06B 9/42 |
| | | | | 160/183 |
| 6,309,076 B1 * | 10/2001 | McVicker | ............... | B60J 1/2041 |
| | | | | 160/238 |
| 6,516,571 B1 * | 2/2003 | Overthun | ............... | A47G 5/00 |
| | | | | 160/351 |
| 6,688,480 B1 * | 2/2004 | Denny | ............... | A47F 5/0043 |
| | | | | 211/180 |
| 7,217,061 B2 * | 5/2007 | Stratton | ............... | E01F 7/00 |
| | | | | 160/24 |
| 7,231,954 B2 * | 6/2007 | Green | ............... | E01F 13/022 |
| | | | | 135/114 |
| 7,377,490 B1 * | 5/2008 | Khosravian | ............... | E01F 13/028 |
| | | | | 119/416 |
| 7,971,622 B2 * | 7/2011 | Trionfetti | ............... | E04B 2/7416 |
| | | | | 160/122 |
| 8,191,604 B2 * | 6/2012 | Wang | ............... | E06B 9/0692 |
| | | | | 160/23.1 |
| 8,516,728 B2 * | 8/2013 | Jung | ............... | G09F 9/301 |
| | | | | 40/610 |
| 8,777,516 B2 * | 7/2014 | Slutz | ............... | B09B 1/004 |
| | | | | 160/120 |
| 9,351,599 B2 * | 5/2016 | Roberts | ............... | A47H 5/03 |
| 2008/0110582 A1 * | 5/2008 | Rasmussen | ............... | E06B 9/44 |
| | | | | 160/263 |
| 2009/0008042 A1 * | 1/2009 | Snyder | ............... | E01F 13/028 |
| | | | | 160/264 |
| 2010/0269312 A1 | 10/2010 | Wagner et al. | | |
| 2012/0097346 A1 * | 4/2012 | Ng | ............... | E06B 9/388 |
| | | | | 160/264 |
| 2012/0156420 A1 | 6/2012 | Greiner | | |

\* cited by examiner

FIG. 1 (PRIOR ART)
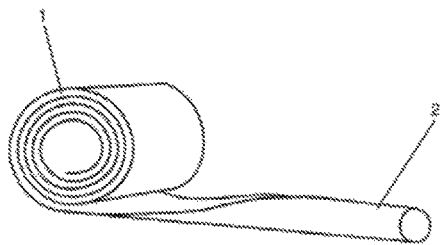
FIG. 2 (PRIOR ART)
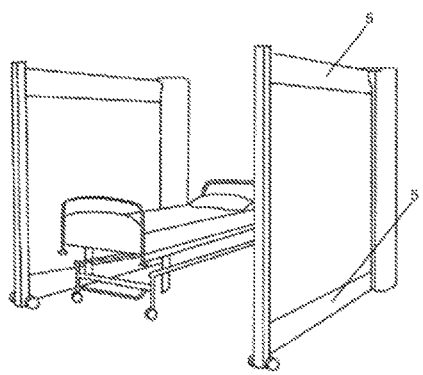
FIG. 3 (PRIOR ART)
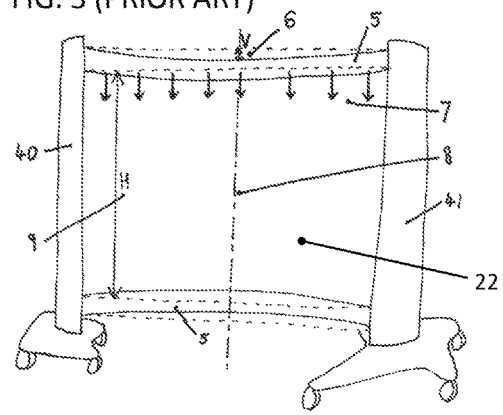
FIG. 4A
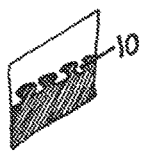
FIG. 4B
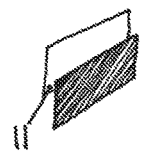
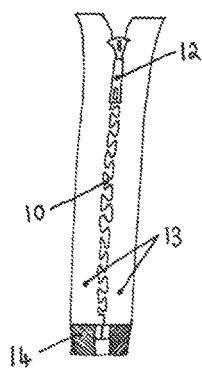
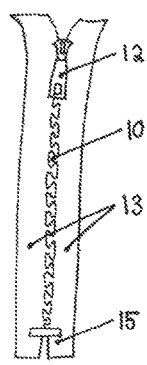
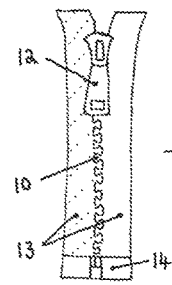
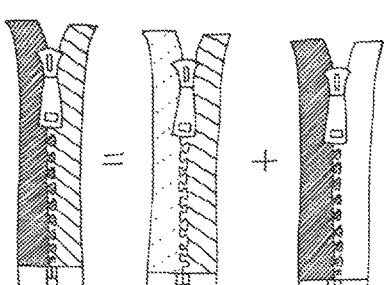
FIG. 5A    FIG. 5B    FIG. 6A    FIG. 6B

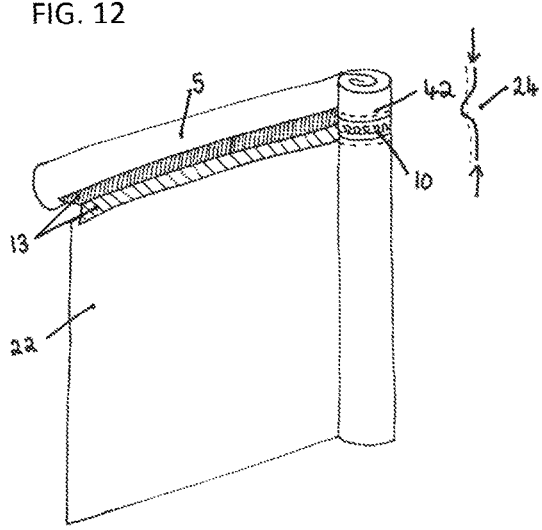
FIG. 12
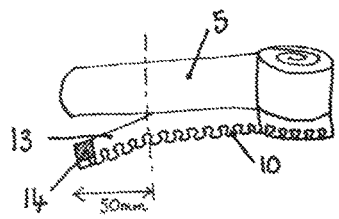
FIG. 13
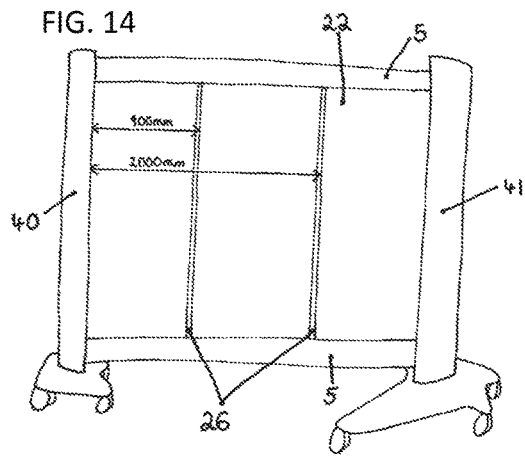
FIG. 14
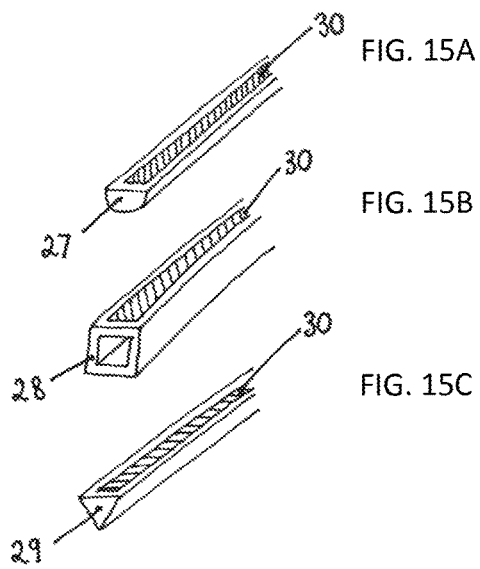
FIG. 15A
FIG. 15B
FIG. 15C
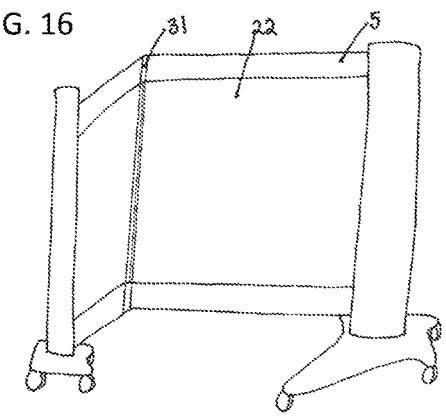
FIG. 16
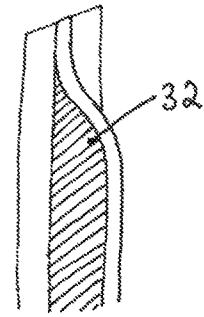
FIG. 17

METHODS FOR IMPROVING STRAIGHTNESS IN THE VERTICAL PLANE OF RETRACTABLE SCREEN PARTITIONS

FIELD OF INVENTION

The present application relates to methods of improving the straightness in the vertical plane of a screen panel attached within a frame structure employing Split Tube Extendable Members (STEMs), which are also referred to herein as split tubes or split tubular structures. A related structure is also described.

BACKGROUND

Currently Bi-stable Reeled Composite (BRC) material technology as described in WO 97/35706 entitled "an extendable member", and WO 88/08620 entitled "an elongated hollow element", is used in a screen product, as per WO 2010/109247 entitled "screens". The BRC technology allows a rigid hollow Split Tube Extendable Member (STEM) to roll up on itself to change from a rolled up state (1) to an extended state (2). This is shown in FIG. 1.

As used herein the term "Split Tube Extendable Member (STEM)" or "split tube" or simply "tube" means a bi-stable member that has a first stable state (rolled up state) in which it can be rolled up flat in a coil and a second stable state (extended state) in which it is in the shape of a tube which forms as it is extended from the rolled up state. Usually, in the extended state, the tube is self-supporting and also capable of supporting other materials. STEMs can be used to form screens, for example to provide privacy around a hospital bed, as shown in FIG. 2; the screens may be made of a framework having STEMs forming the top strut (and usually a bottom strut as well) of the framework, with the uprights of the framework supporting the STEMs. A screen can be held within this framework, as will be described in more detail later. One substantial advantage of such an arrangement, as described in WO2010/109247 and used in the present invention, is that the STEMs can be rolled up, usually together with the screen itself, thereby retracting the screen. The screens are therefore made of rollable material and often of a material that is substantially inelastic to provide a taut, stiff screen. This is the arrangement used in the present invention, which provides improvements on the arrangement described in WO2010/109247.

An example of the arrangement described in WO2010/109247 will now be given by reference to FIG. 3. The mechanical properties of a frame structure employing split tubes (5) are dependent upon the stiffness of the split tubes. Such a structure comprises split tubes as its upper and lower edges, with a body (41) and handle (40) as the vertical supporting sides. The split tubes (5) are rolled up inside the body (41) at one end, while the other end is attached to a handle (40). The split tubes can be pulled out from the body into the extended position shown in FIGS. 2 and 3 by pulling on the handle (40), which unrolls the split tubes and causes the tubes to be pulled out from the body (41) to change from the rolled up (flat) configuration (FIG. 1) to the extended (tubular) configuration thereby deploying the screen.

When the screen has been deployed, as shown in FIGS. 2 and 3, the load exerted from attaching a screen panel (7) between the top and bottom split tubes (5) as well as gravity exerted on the tubes themselves causes the split tubes to experience a vertical displacement V (6) at the midpoint (8) of their span, as shown in FIG. 3. It is desirable for this vertical force exerted on the split tubes (5) by the screen panel (7) to be evenly distributed along the span of the split tube, in order to prevent twisting and/or buckling of the split tubes. The present invention details methods by which the effects of this twisting and/or buckling phenomena can be lessened or eradicated.

Upon the transition between a rolled up state (1) to an extended state (2), a split tube (5) undergoes a complex physical geometric transformation, as shown in FIG. 18. Two properties of note are:
  the change in linear width, W of the split tube between the two states: the linear width of the extended tube, We (34) is less than the linear width of the tube in the closed rolled up state, Wc (33); and
  the natural length L (35) over which this transition occurs.

It is these parameters which define the natural edge profile of a split tube, as shown in FIG. 18. The transition region between the flat state (1) of a split tube and its tubular extended state means that the inner region of a frame structure employing split tubes is not strictly rectangular. The product described in WO 2010/109247, as shown in FIG. 2, has the longitudinal edge of the screen panel (22) attaching to the longitudinal edge of the split tube (5) via a zip. The end of the split tubes (5) at the centre of the coil (1) shown in FIG. 1 is secured to an axle within the body (41) via means of a flat clamp, forcing the tube into the flat, coiled state (1), as shown in FIGS. 1 and 19. The tube (5) is clamped at its free end to the handle (40) in its tubular state, which urges the tube to adopt a tubular configuration (2). This poses a technical problem at the transition of the split tube's two states.

Currently the split tube (5) technology has many applications and is generally used either as a single tube or as part of a larger structure, with elements connecting to one or more tubes. A retractable room divider as described in WO 2010/109247 (FIG. 2) is an example of a larger structure design using split tubes (5). This divider uses two parallel horizontal split tubes (5) as the top and bottom edges of the frame structure, to which a screen panel is attached. Such a screen panel, which is indicated by the reference number 22 in FIG. 11, is attached to the two split tubes (5) via means of a zip (10), whereby for each of the two horizontal edges of the screen, one half of a zip is sewn to the screen, and the other half to a split tube. The transition between the flat and tubular states of the split tubes at the corners of the screen (22) causes the screen to pucker at these corners.

SUMMARY OF INVENTION

The present invention seeks to improve the straightness in the vertical plane of a screen panel (22) attached within a rectangular frame structure employing split tubes (5) as its top and bottom edges/struts. The present specification details five aspects or embodiments of the present invention by which to improve the straightness of a screen panel (22), relating to five key areas:
  1. zip attachment of the screen panel to the split tubes
  2. dependence of teeth orientation
  3. reinforcement of the frame structure using struts
  4. clamping of the split tubes to the frame
  5. modification of the screen panel These embodiments may be used individually or in a combination of two or more of them.

In a first aspect of the disclosure, there is provided a method of attaching a screen to a split tube extendable member that is extendable between a rolled up configuration and an extended configuration, wherein the split tube extendable member and the screen each comprises a half zip that can be engaged with each other to attach the screen to the split tube extendable member. The method comprises (a) taking a jig having a half zip (or half zip) that has a known configuration of tooth spacing ("jig half zip"); (b) engaging a half zip (or zip half) that is to be attached to the split tube extendable member ("tube half zip") to the jig half zip and securing the tube half zip to the tube; (c) taking a jig having a half zip that has a known configuration ("jig half zip"); and (d) engaging a half zip that is to be attached to the screen ("screen half zip") to the jig half zip and securing the screen half zip to the screen. Either the same jig half zip is used in both steps (a) and (c), or the jig half zips used in steps (a) and (c) have substantially the same configuration. The half zips attached to a number of tubes and the half zips attached to a number of screens all have a substantially identical configuration so that each screen can be engaged with any of said number of split tubes and each split tube can be engaged with any of said number of screens.

Optionally, one or more of said half zips (or zip halves) are stretchable to provide said configuration of tooth spacing.

Optionally, the length of the jig half zip is the same as or shorter than the unstretched length of the tube half zip and/or the screen half zip, for example by up to 5%, e.g. by 1 to 3%.

In a second aspect of the disclosure, there is provided a structure comprising a frame comprising at least one split tube extendable member that is extendible between a rolled-up configuration and an extended configuration, and a screen, wherein the split tube extendable member and the screen each comprises a half zip (or half zip) that can be engaged with each other to attach the screen to the split tube extendable member, wherein said half zips (or zip halves) are stretchable to provide the same tooth spacing for the half zip (or half zip) attached to the split tube extendable member and the half zip attached to the screen.

Optionally, the frame comprises a body for holding the split tube extendable member in the rolled-up configuration and a handle for supporting a free end of the split tube extendable member when it is extended.

Optionally, in its rolled-up configuration, the split tube extendable member is in a flattened state rolled up in a coil, and in its extended configuration, at least part of the split tube extendable member is in a tubular state, the split tube extendable member being secured in its flattened state to the handle.

Optionally, the screen has a cut-out where it is attached to the split tube extendable member in the region of the handle, to accommodate the region of the split tube extendable member when it changes from its flattened state where it is secured to the handle to its tubular state.

Optionally, the frame comprises two split tube extendable members, one being attached to the top of the screen and the second being attached to the bottom of the screen.

In a third aspect of the disclosure, there is provided a structure comprising a frame comprising at least one split tube extendable member that is extendible between a rolled-up configuration and an extended configuration, and a screen attached to the frame and having a convex side and a concave side when the frame is in its rolled up configuration, wherein the split tube and the screen each comprises a half zip (or zip half) that are engaged with each other to attach the screen to the tube, wherein teeth of each of the zip halves protrude towards one side of the zip half, and wherein the zip halves are attached in such a way that the teeth of the zip halves protrude towards the convex side of the screen.

Optionally, the frame comprises a body for holding the split tube extendable member in a rolled-up configuration and a handle for supporting a free end of the split tube extendable member when it is extended.

Optionally, in its rolled-up configuration, the split tube extendable member is in a flattened state rolled up in a coil, and in its extended configuration, at least part of the split tube extendable member is in a tubular state, the split tube extendable member being secured in its flattened state to the handle.

Optionally, the screen has a cut-out where it is attached to the split tube extendable member in the region of the handle, to accommodate the region of the split tube extendable member when it changes from its flattened state where it is secured to the handle to its tubular state.

Optionally, the frame comprises two split tube extendable members, one being attached to the top of the screen and the second being attached to the bottom of the screen by said zips.

In a fourth aspect of the disclosure, there is provided a structure comprising a frame comprising an upper split tube extendable member and a lower split tube extendable member that are extendible between a rolled-up configuration and an extended configuration and a screen attached to the upper and lower split tube extendable members, e.g. by a zip, wherein at least one rigid rod is attached to the screen that extends vertically along at least part of the distance between the upper and the lower split tube extendable members.

Optionally, the at least one rod extends substantially the whole of the distance between the upper and the lower split tube extendable members.

Optionally, the at least one rod overlaps with one or both of the upper split tube extendable member and the lower split tube extendable member.

Optionally, the at least one rod has a profile that a user can grip to form a bend in the split tube extendable members and the screen.

Optionally, the at least one rod has a T-shaped profile.

Optionally, the frame comprises a body for holding the split tube extendable members in a rolled-up configuration and a handle for supporting a free end of the split tube extendable members when they are extended.

Optionally, in their rolled-up configurations, the split tube extendable members are in a flattened state rolled up in a coil, and in their extended configurations, at least part of the split tube extendable members are in a tubular state, the split tube extendable members being secured in their flattened states to the handle.

Optionally, the screen has a cut-out where it is attached to the split tube extendable members in the region of the handle, to accommodate the region of the split tube extendable members when they change from their flattened states where they are secured to the handle to their tubular state.

In a fifth aspect of the disclosure, there is provided a frame comprising at least one split tube extendable member that is extendible between a rolled up configuration in which the tube is in a flattened state rolled up in a coil and an extended configuration in which at least part of the split tube extendable member is in a tubular state; a body for holding the split tube extendable member that is in its rolled up configuration and a handle for supporting a free end of the split tube extendable member when it is extended, wherein the split tube extendable member is secured in a flat state to the handle.

Optionally, a screen is attached to the split tube extendable member, wherein the screen has a cut out, where it is attached to the split tube extendable member in the region of the handle to accommodate the region of the split tube extendable member when it changes from its flat state where it is secured to the handle to its tubular state.

Optionally, the frame comprises two split tube extendable members, one being attached to the top of the screen and the second being attached to the bottom of the screen.

In a sixth aspect of the disclosure, there is provided a structure comprising a combination of two or more of the second, third, fourth and fifth aspects of the disclosure or any optional feature thereof.

BRIEF DESCRIPTION OF THE FIGURES

The present invention will be described, by way of example, with reference to the following drawings in which:

FIG. 1 shows a split tube, in its coiled and extended states
FIG. 2 shows a screen product incorporating split tubes
FIG. 3 shows the vertical deflection of the top split tube in a frame structure
FIG. 4A shows the in-plane nature of zip attachments
FIG. 4B shows the overlapping nature of other attachments
FIGS. 5A and 5B show the difference between open and closed ended zips
FIGS. 6A and 6B show the definition of an interchangeable zip
FIG. 12 shows an assembly with the zip teeth on the outside face of the screen
FIG. 13 shows a split tube sewn to an open-ended zip with the end of the zip left free
FIG. 14 shows the ideal position of the reinforcing rods
FIGS. 15A-C show the range of appropriate rod cross-sections, with double-sided adhesive tape applied
FIG. 16 shows a screen bent into a corner with the aid of a reinforcing rod
FIG. 17 shows a "T" section rod with its flange cut away at the end

1. ZIP ATTACHMENT

Background

Figure 7A:
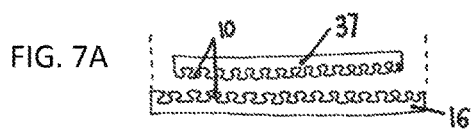
FIGS. 7A-C show the problem and solution when using a zip half which is too long

As discussed above, the product described in WO 2010/109247, has a screen panel (22), the top and bottom longitudinal edges of which are attached to one longitudinal edge of each of two split tubes (5) by means of two zips. This is a good method by which to attach them, since, as shown in FIG. 4A, both sides of the zip lie in the same plane, with the two halves of the zip intertwining via the teeth (10); in contrast, if the screen were stitched onto the edge of the split tube, the screen and the tube would overlap and lie in different planes, see (11) as shown in FIG. 4B. This is important, since any overlapping (11) within the means of attachment could cause stretching of the outer overlapping part and compression of the inner overlapping part when rolled up, resulting in a tendency for the part that is in compression to move relative to the stretched part upon each rolling and unrolling cycle of the split tubes (5) to which it is attached.

As shown in FIGS. 5A and 5B, zips are categorised according to whether they are open ended (14) or closed ended (15); the most prominent difference between the two being that the two halves of open ended zips can be fully separated from each other, whereas the two halves of closed ended zips are permanently joined together via a connecting bar (15) at one end, meaning they cannot be separated fully along their length. To allow interchangeability of the screen panels (22) within a split tube frame structure, the zip employed must be open ended (14) rather than closed ended (15). It is the requirement for interchangeability that introduces the desirability for every pair of zip halves to be and behave in a manner which is identical in order to avoid the accumulation of stresses between different combinations of screen panels (22) and frame structures, caused by misalignment of the teeth (10).

The misalignment of the teeth (10) of a zip can result in difficulty of fastening the zip halves together, since some teeth (10) may exhibit bunching in one half of the zip, thus inducing stresses in the zip. This causes compression of the split tubes (5), which causes them to weaken, through bowing, kinking and/or buckling. It can also create puckering or creasing in the screen panel (22), which is particularly prominent if the screen material is inelastic and stiff, e.g. polyester film.

Figure 21:
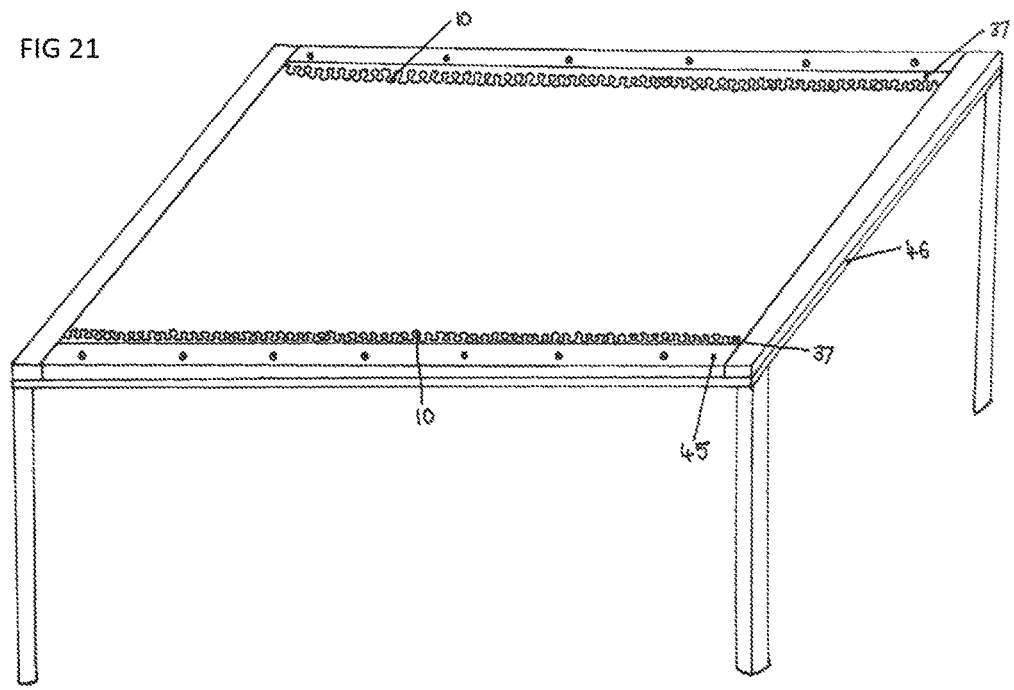
FIG. 21 illustrates the fundamental principal layout of the jig used to fit zips to the screen panels

In order to ensure consistently identical zip halves between screen panels (22) and split tubes (5), it is preferable to attach the zip halves to the screen panel (22) and to the split tubes (5) using a rigid jig, which acts as a template to fix the zips in the correct position before they are sewn in place. This jig, as shown in FIG. 21, comprises a rigid rectangular frame (45) clamped to a table (46); the size of the frame is preferably approximately the same as the dimensions of the rectangular screen panel (22). A zip half (37) is fixed to, and runs along, each of the two long sides of this jig frame (45). These zips halves (37) are referred to herein as the "master zip" halves, their purpose being to allow another pair of zip halves to be zipped to them, and then attached to the long edges of the screen panel. This same method of application is used to attach zip halves to the split tubes (5). This ensures that the zip halves on every screen panel (22) and top or bottom split tube (5) will be identical, in order to allow the teeth (10) between the two zip halves of any screen (22) product to pair up exactly with the teeth in the zip halves of any tube (5).

However, it should be noted that the use of such a jig does not wholly address this issue, since the method of manufacture of open ended zips (14) introduces discrepancies between batches, causing length and tooth count variations of up to ±10%, as shown in FIG. 9, which is a graph showing the distribution, in a batch, of the length of zips having the same number of teeth. In FIG. 9, the x-axis represents the available zip lengths within a batch, while the y-axis represents, the quantity of zips of a given length within a batch, i.e. their distribution. As a result of the variation in the lengths of the various zips, different zip halves may be subjected to tensile or compressive stresses relative to the master zip (37) when zipped into the jig.

Figure 7B:
Figure 8A:
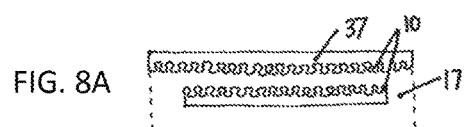
FIGS. 8A-C show the problem and solution when using a zip half which is too short
Figure 8B:
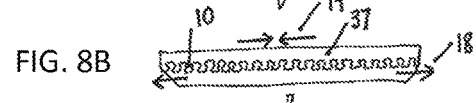
Figure 9A:
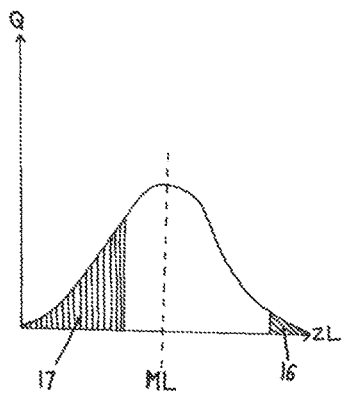
FIG. 9A shows the length distribution of zips which may exist between and within batches, and the number of rejected zips when the master zip is chosen to be of the modal length
Figure 9B:
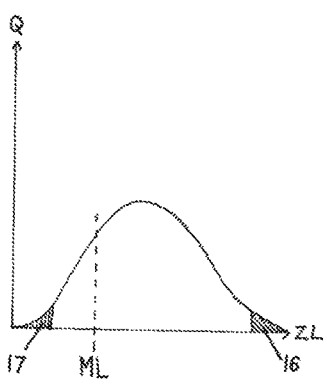
FIG. 9B shows the length distribution of zips which may exist between and within batches, and the number of rejected zips when the master zip is chosen to be undersized
Figure 10:
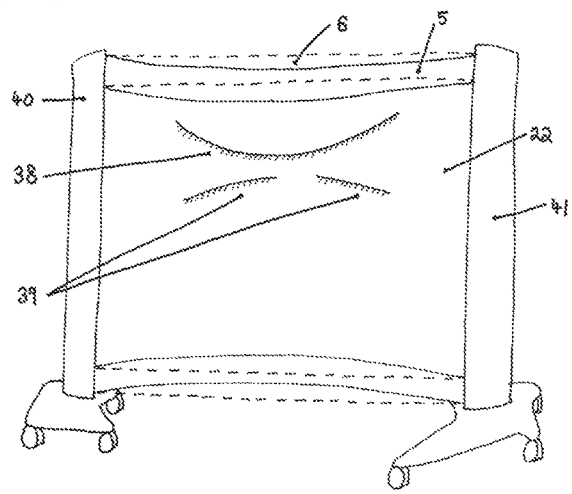
FIG. 10 shows the creases which form in the screen panel

If the zip half being applied is too long (16) relative to the master jig zip as shown in FIGS. 7A and 7B, it will be forced into ruching (19), causing its tape (13) to follow a wobbly path rather than the desired straight line. Conversely, if the zip half being applied is too short (17) relative to the master jig zip (37) it will become taught (18), as shown in FIGS. 8A and 8B, inducing a tendency for the zip to relieve itself, which will exert a compressive stress (19) on the element (screen panel or split tube) to which the zip half is attached, and will cause puckering and shrinkage of its tape. An oversized ruched zip (16) induces less severe physical consequences than an undersized stretched zip (17) relative to the master zip (37), thus the master zip (37) for the rigid jig (FIG. 21) is chosen to be undersized. This is because, if the master zip (37) length ML is chosen to be the modal length (i.e. the most common zip length within a batch), the number of zips which are too short (17) will be much larger than if the master zip length is chosen to be much shorter than the modal length. Since it is much worse for the zip to be too short (17) than too long, it is thus desirable to minimise the number of zips which will be categorised as "too short" relative to the master zip. Hence, the master zip length ML is chosen to be slightly undersized relative to the modal length of the zips, where the modal length is shown as the dotted line in FIG. 9A and FIG. 9B. FIG. 9A shows the number of rejected zips (shown as the shaded area) as being much larger than in FIG. 9B, where the number of rejected zips is also shown as the shaded area. FIG. 9A represents the situation where the master zip (37) has been chosen to be the modal length within a batch, whereas FIG. 9B represents the scenario of selecting an undersized master zip (37). This is much lower than if the master jig zip length were set to be equal to the modal length of the batch of zips because the tolerance to zips being larger than the master jig zip length is much greater tolerance to zips being smaller than the master jig zip length.

The preferred method of applying the zip half to the edge of a screen panel (22) or split tube (5) is to attach the zip half to the master jig zip and secure the screen panel or the split tube to the zip half with, for example, a double sided adhesive tape and then to sew (42) through this to secure the zip to the screen panel/split tube. The preferred adhesive tape is a thin paper adhesive which is high tack, but thin and easy to sew through without accumulating stickiness on the needle, such as that produced by the brand Venture, although any suitable tape can be used. If there is a high compressive force (19) on the zip half as a result of the tube or screen zip half being smaller than the master jig zip half, then when the screen panel (22) is removed from the master zip (37) jig, the zip can unreel from the screen, causing puckering or de-bonding of the adhesive tape. The zip half needs to not only be aligned along the edge of the screen panel (22) in terms of tooth count, but it must also be straight, as any unevenness will result in wrinkling and creasing of the zip's fabric tape (13).

Figure 7C:
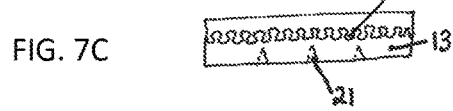
Figure 8C:
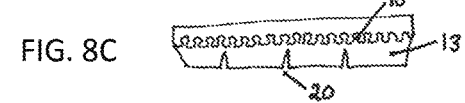

In order to reduce or eliminate the effect of tensile and compressive deformation of both the zip's fabric tape (13) and the adhesive tape by which it is affixed, an interchangeable zip (FIGS. 6A and 6B) with a length and tooth count tolerance of ±1% is desired. However, due to the manufacturing process of open ended (14) zips, this is difficult to achieve. Therefore, embodiments for correcting these phenomenon include cutting short vertical incisions (20) in the fabric tape (13) of the zip half at regular intervals, as shown in FIG. 7C and FIG. 8C. This allows the zip to either stretch, by stretching out the vertical incisions into triangular cuts (FIG. 8C), or to compress, by letting the edges of the incisions overlap with each other (FIG. 7C). However, this solution is time consuming, is not aesthetically pleasing, and can cause fraying.

This aspect of the present invention provides a solution to the problems resulting from the different lengths of zip halves, relative to the master zip (37), in a batch. The solution according to this aspect of the present invention does not increase the manufacture time, and maintains a high quality aesthetic perception of the product when used. In accordance with this, in the present invention, an elasticated zip (whose fabric tape (13) and teeth (10) are extensible in the longitudinal direction) is used. Such an elasticated zip preferably has a linear extension under a stretching force of 20 N of at 2% and preferably at most 10%. This allows for variations in zip length relative to the master zip (37) of the interchangeable zips which are employed. It should be noted that interchangeable (open ended) zips are required to facilitate the swapping of different screen panels (22) within frame structures, and elasticated zips are desirable to lessen the effects of poor tolerances on zip length of these interchangeable zips.

Figure 23:
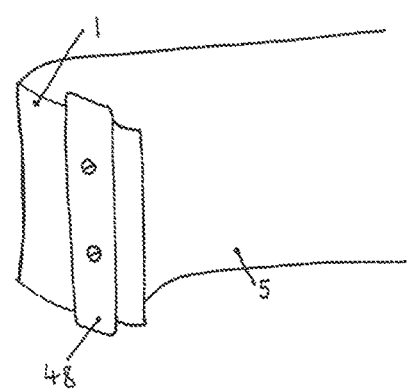
FIG. 23 shows a split tube clamped in its coiled state

The elasticated zip halves described above can be attached to the edge of a split tube (5) using the jig shown in FIG. 21 and using the technique described above in connection with attachment to a screen panel (22), see FIG. 23. Indeed both of the screen panel (22) and the split tube (5) are preferably attached to respective zip halves using the jig.

Preferred Embodiment

In order to prevent bulging, the cross sectional profile of the zip, i.e. its thickness, is preferably no greater than 2 mm. Coats' Opti brand of interchangeable zips are preferred for their high tolerances of length and tooth count (FIG. 6); for example, the P40 and S60 interchangeable models. YKK's CNFOR-55 DWL E ELT N-ANTI P-TOP are the preferred variety of elasticated open ended (14) zips. A double sided zipper tag (12) allows for operable access from both sides of the screen, which is advantageous given the zip's orientation within the frame structure. Any suitable zip can be used.

Attachment of the Zips

It can be difficult to zip a split tube's (5) zip half to a screen panel's zip half (22), therefore the zip half which is attached to the split tube has its tape (13) left free, unattached from the split tube for the first 50 mm (25), as shown in FIG. 13. This allows for easy manipulation of the zip, thus allowing for this half of the zip to be easily zipped to its other half

2. ZIP TEETH ORIENTATION

Background

As illustrated in FIG. 12, for a rollable, retractable screen (FIG. 2) comprising a split tube (5) frame structure and screen panel (22), it is preferable for the zips to be attached in such a way that their teeth (10) are protruding on the outside face of the screen panel (22). The outside face of the screen panel (22) is defined as that which can be seen as the end of the screen rolls up inside the body (41). Hence, if the zips are attached in such a way that their teeth (10) are protruding on the outside face of the screen panel (22), they will be visible on the outside face of the screen panel (22), and thus will be visible on the rolled up portion of the screen panel, as shown in FIG. 12.

Figure 11:
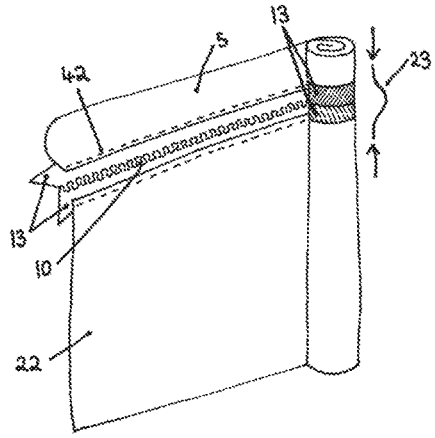
FIG. 11 shows an assembly with the zip teeth on the inside face of the screen

Conversely, should the zips be attached with their teeth (10) protruding on the inside face of the screen panel (22), as shown in FIG. 11, the zips' teeth will not be visible on the rolled up portion of the screen panel, since they will be facing radially inwards. This configuration will result in billowing (23) of the zips as the screen panel (22) is rolled up, since they are inherently less structural and more deformable than the screen panel material. Such billowing manifests itself as outwards parabolic displacement (23) of the zips' teeth (10) and fabric tape (13), causing the coiling of the rolled up portion of the screen to be less tight and controlled.

Preferred Embodiment

Attaching the zips with their teeth (10) protruding on the outside face of the screen panel (22), as illustrated in FIG. 12, eradicates any billowing, since naturally the zips would want to buckle/billow inwards (24), i.e. in the negative radial direction. This is impossible, since there is no free space available within the coiled up section of the screen panel (22). Forcing the zips to not billow, this configuration thus allows the screen to roll up more tightly, and with a reduced degree of downwards helical coiling. This configuration is thus employed in the present invention.

3. CORRECTION OF THE "SMILE" AND CREASES

Background

A given frame structure employing split tubes (5) along the top and bottom edge will not remain perfectly rectangular in shape, in that its horizontal edges will not be straight. This is due to the vertical deflection (6) of the split tubes (5), caused by the sagging of the split tubes (5) under their own weight, plus the distributed load of any components that may be attached to them. Inherently, both split tubes (5) will be deflected by an equal amount under their own weight; however this is not the case when a screen panel (22) is attached to the bottom edge of the top split tube and the top edge of the lower split tube, as exhibited in the screen product, as per WO 2010/109247, see FIGS. 3 and 4. If a rollable, inelastic, stiff material is employed as the screen panel (22), the attachment of the screen panel via zips to the two split tubes (5), prevents the bottom split tube from deflecting downwards when the screen is taut since the screen is held in its upper two corners and the tension in the screen therefore supports the bottom split tube. Regardless of whether or not a screen panel (22) is attached within the split tube (5) frame structure, or is removed, the top split tube will exhibit a vertical deflection, which reaches a maximum at the midpoint of its span (8), regardless of the length to which the screen is pulled out. However, as stated above, the bottom split tube (5) will only deflect when the screen panel (22) is not attached to the split tube frame structure and it will not sag if a taut screen is present. Thus, in the described use, the bottom split tube (5) can be assumed to extend horizontally when a screen is attached.

If a screen made of a rollable inelastic material is attached into the aforementioned frame, it will not hang straight in the vertical plane as a result of the above-described sagging of the upper split tube and the non-sagging of the lower tube, causing a distinct "smile" shaped crease along the top edge of the screen panel (22), along with several other unwanted creases lower down the screen, and often the screen is also subject to pucker.

One benefit of using split tubes (5) in the frame structure for supporting a screen is that they allow the screen to be bent to form a corner at any point along the length of the extended split tubes, as shown in FIG. 16. However, it is difficult for a single user to execute such a bend neatly and easily. Also the bending of the screen leaves the bent corner of the screen susceptible to external damage and disturbances.

It would be beneficial to solve the above two problems which the industry is facing, namely the "smile" shaped creasing of the screen panels, and the difficulty of producing a neatly defined, strong bend, especially one that can be made by a single user. The present invention seeks to solve both these problems by securing rigid rods to the screen panel, to act as struts in the vertical plane. The rods reduce the force on the upper tube that cause it to sag and also force the screen panel to hang straight in the vertical plane, thus preventing or reducing creasing in the screen, e.g. the smile crease discussed above. Simultaneously, the rods encourage the easy formation of a vertical bend of the screen panel and split tubes at the location of a rod, and reinforce the weak edge of such a bend. Possible embodiments of this are outlined in the following section.

Preferred Embodiment

In order to reduce or eliminate a "smile" crease in accordance with the present invention, the vertical deflection (6) of the upper split tube (5), especially at the midpoint (8) of its span, should be reduced to zero, as shown in FIG. 3. Numerous attempts to reduce the smile crease have been made by improving the stiffness (e.g. by adjusting the Young's Modulus, E, and second moment of area, I) of the split tubes by modifying their composition and manufacture. However, achieving a stiffness sufficient to reduce the vertical deflection at their midpoint to zero or near zero compromises the tubes' function in other areas—for example, a stiffer split tube (5) will be much more difficult to roll up. After much prototyping, the discovered solution was found to maintain a substantially constant distance, H (9) between the top and bottom split tubes, preferably along the entirely of their spans. The present invention is to affix vertical rods (26) to the screen panel (22) in the vertical plane (FIG. 14), acting as struts. Such application of rigid rods (26) forces the screen panel (22) to hang more straight in the vertical plane, simultaneously reducing the vertical deflection (6) at the midpoint (8) to an acceptable level. Advantageously, the application of rods to the screen panel does not interfere with rolling up. The rods may be attached to the screen by any suitable means, e.g. stitching them onto or within the screen or adhering them onto the screen with adhesive, conveniently using double-sided adhesive tape. The rods are preferably not attached to the tubes since that would interfere with their transition between a rolled-up and an extended state. However, as discussed below, the rods may overlap the tubes but in this case, they should not be actually attached to them, as this would interfere with their rolling up.

It should be noted that the addition of such reinforcing rods (26) reduces the need for the material employed as the screen panel (22) to be as inelastic or unstretchable as those which have previously been employed, since the rods (26) themselves provide a substantial level of support for the screen and the upper tube (5). Hence, materials other than polyester film would be appropriate; for example, other polymer based films, and/or textiles based woven materials, such as those used in roller blinds.

Any number of rods (26) may be affixed to the screen panel (22), ranging from one to many. For two rods, the preferred location of application of the rods on a screen panel which is 3500 mm wide and 1540 high, is at 900 mm and 2000 mm measured horizontally from the leading edge, as shown in FIG. 14.

In order to achieve an appropriate level of rigidity, which is the most important property of the rods (26), aluminium with a rectangular cross-section of 9×3 mm is suitable. However any rod that is sufficiently rigid that it supports the upper split tube (5), while not obstructing the ability of the tubes and the screen to roll up, will be suitable.

To avoid compromise of the aesthetics of the screen panel, optically clear acrylic (PMMA) rods are suitable, which may be affixed using double sided tape (30) to the screen. In order to achieve the equivalent stiffness of the aforementioned 9×3 mm rectangular cross-section aluminium rods by using such a plastic, it is necessary to consider the second moment of area, $I_{xx}$, of the rod's cross-section.

A solid half round (27) clear acrylic strut would have to have a diameter of 15 mm to match the stiffness of the aforementioned aluminium strut. A hollow square (28) clear acrylic rod with a wall thickness of 1.6 min and a side length of 9.5 mm, or a solid equilateral triangular (29) rod of side length 12 mm, would also be sufficient, as illustrated in FIGS. 15A-C. Any rod of these geometries in a larger size would exceed the stiffness of the aforementioned aluminium rod.

The rods are preferably attached to the inside face of the screen.

Screen Bending & One-Handed Bend Operation

The present invention of correcting the straightness of the screen panel (22) via the use of rods (26) as struts simultaneously facilitates easy and better-defined bending of the screen (FIG. 16) to form a corner, as shown in FIG. 16. The rod (26) may be the same length as the height of the screen panel, however one embodiment is to increase the rod to a length (31) that covers the full distance between the top edge of the upper split tube and the bottom edge of the lower split tube. A "T" section (FIG. 17) rod (32) may be used with the bar of the "T" being fixed to the screen while the stem or flange of the "T" enables the user to grip onto the rod (31), thus allowing the user to pull or push the rod to form the bend in the screen using only a one-handed operation. If a "T" shaped rod is used, the stem or flange of the "T" may be removed at the portion of the rod overlapping the split tube so that the protruding thickness of the rod does not interfere with the rolling up of the tube or increase the diameter of the rolled-up tube more than is acceptable.

It is desired that the distance between the bottom edge of the upper split tube and the top edge of the lower split tube i.e. the height of the screen panel H (9) remains constant, in order to ensure the frame structure remains planar. However, when bends are put into the screen (FIG. 16), the distance H between the top and the bottom tubes is likely to decrease due to a lack of support of the screen by the top tube in the region of the bend, unless the bend is made at the same location as a rod.

It should be noted that without such rods/struts in place, bending the split tubes (5) in parallel can result in a highly creased screen panel (22), since it will be more susceptible to creasing from external accidental impacts. Bending the screen (FIG. 16) at the location of a reinforcing rod (26, 31), where present, allows for the desired single vertical crease to form, since the rod (26, 31) reinforces the bend.

The advantage of using many rods is that it increases the choice of where the screen can be bent, though many rods would increase the weight and bulk of the screen.

4. CLAMPING OF THE SPLIT TUBES AND MODIFICATION OF THE SCREEN PANEL IN ACCORDANCE WITH THEIR GEOMETRY

Background

A split tube (5) has two defining widths (defined as the geometric length in the transverse direction), see FIG. 29: one for its closed rolled-up state, Wc, (33) and one for its extended state, We. (34) In the closed rolled-up state (1), the split tube has a straight profile, whereas in the extended state (2), its cross section is curved.

Figure 18:
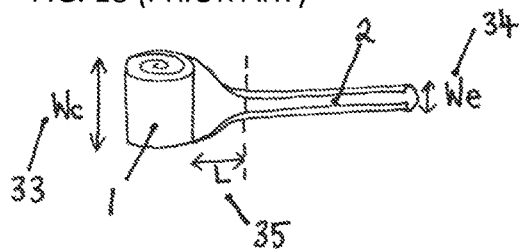
FIG. 18 shows the transitional geometric change of a split tube between its coiled and extended states

Since the split tube (5) is inelastic, the transverse curving of the split tube in its extended state (2) means that the linear width of the split tube in this state (34) is less than the linear width of the split tube in its rolled-up state (33); i.e. We<Wc. For a split tube (5) of linear width 75 mm in the closed rolled-up state (1), i.e. one which has been manufactured to be 75 mm wide, its linear width in the extended state (2) is 55 mm. This difference, D of 20 mm is accounted for by the split tube's radius of curvature in the extended state (2), as shown in FIG. 18.

In a rollable split tube (5) structure frame, split tubes form the horizontal sides of the frame, and are clamped in place at either end to the handle (40) and body (41)—see FIG. 3. In FIG. 3, the reference number 41 indicates a body containing an axis (rotor) about which the rolled up section of the split tubes (5) can rotate and be wound up, simultaneously winding up the screen as well. Reference number 40 indicates an upright in the form of a handle attached to one end of each of the tubes (5). The screen (7) and tubes (5) can be pulled out from the body (41) by pulling on the handle (40), thereby transforming the tubes (5) extending out from the body from their rolled up state (1) to their extended tubular state (2) see FIG. 1. Conversely, the screen can be retracted by pushing the handle (40) towards the body (41), thereby transforming the tubes (5) extending out from the body from their extended state (2) to their rolled up state (1).

Figure 22:
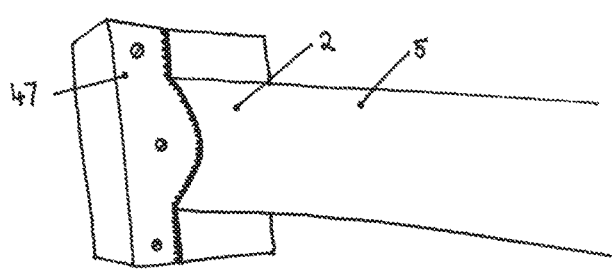
FIG. 22 shows a split tube clamped in its extended state

In previous designs, the ends of the split tubes (5) have been clamped in place to the handle 40 in their extended state (2) i.e. the ends of the tubes have a curved profile shape. This was achieved by a clamp (47), as illustrated in FIG. 22, securing the ends of the tubes (5) in their extended tubular state (2) to the handle (5). The split tubes (5) were held in a curved "C" shaped slit in the clamp (47). This ensured that the portions of the split tubes (5) extending from the body (41) were essentially in the same extended (curved, tubular) state (2), except for a transition region nearest the body. This means that the extended parts of the split tubes had essentially the same linear width all the way along their lengths, hence their edges were straight and horizontal. This meant that the cavity into which the screen panels (22) were attached was in theory a perfect rectangle, so that the screen panels would hang nicely in the vertical plane. However, with such an arrangement, the screens could not be fully closed, i.e. the handle (40) and body (41)

could not lie immediately against each other since this was prevented by the presence of the transition region of the tubes between the rolled-up state (1) in the body (41) and the extended (tubular) state (2) at their ends where the tubes are attached to the handle (40). Magnets were explored to keep the handle (40) and body (41) together, however the sheer presence of the transition region of the split tubes (5) meant that closure by this method was very difficult to achieve.

In order to combat this problem of not being able to close the handle (40) and body (41) together, one aspect of the present invention clamps the split tubes (5) to the handle in their flat profiled state (1), i.e. in the state the tube adopts when rolled up. This can be achieved by means of a flat clamping mechanism in the handle (40), as shown in FIG. 23. The linear width of each of the split tubes at either end is Wc. With their ends clamped, it takes a distance L (35) for the split tubes to reach their fully uncoiled tubular state (2)—i.e. the longitudinal position whereby the linear width of the split tube reaches We. This distance will be referred to as a "transition" region or zone. When the split tubes are extended, transition zones are present (a) most noticeably at the free end of an extended tube between the flat free end held in clamp (48) and the fully tubular state (2) and also (b) between the tube in its fully tubular state (2) and the rolled up tube section (1) held in the body (40). With the two ends of the tube clamped flat, when the handle (40) is pushed towards the body (41) to retract the screen, the central fully uncoiled tubular state (2) gradually becomes shorter and the two transition zones at the two ends eventually merge together into one leaving the split tube wholly in its flat state (1), thereby allowing the handle (40) to be pushed right against the body (41), thus allowing the framework and the screen to be fully retracted.

Figure 19:
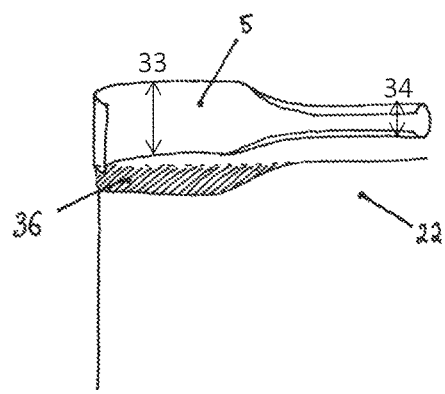
FIG. 19 shows the invention of cutting the screen panel to equate for the spline profile of the split tube
Figure 20:
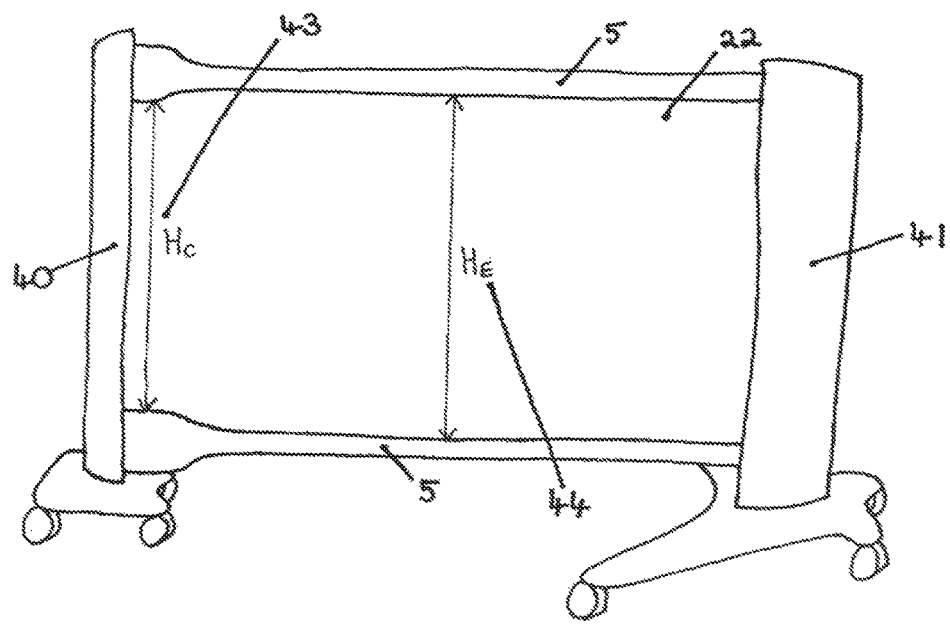
FIG. 20 shows the change in vertical height of a screen panel due to the geometric physical change of the split tubes between their two states

This difference between the linear width of the split tube (5) at its free end (e.g. the flat end of the tube shown in FIG. 3 that is attached to the handle 40, see FIG. 23) and the equilibrium width of the tube in its extended tubular state at distance L creates a shallow curved spline/scallop profile to the tube in the transition zone (FIG. 19). A rectangular screen panel (22) made from an inextensible material attached to the inner edge of the tube (5) will therefore not hang straight in the vertical plane, thus causing unwanted creasing. This is shown in FIG. 20, where HC, the vertical height of the screen panel (22) close to the handle (40), where the tubes are clamped in their coiled up state (1), is less than HE, the vertical height of the screen panel (22) elsewhere along the span of the split tubes (5), where they are in their extended state (2).

The present invention seeks to solve the problem in the industry of the screens not shutting correctly, while at the same time avoids unwanted amount of creasing of the screen panel (22) Thus, a preferred embodiment of the present invention is to alter the shape of the screen panel (22) in accordance with the geometrical transitional edge profile of the split tubes (55), to remove unwanted creasing.

Preferred Embodiment

The present invention is to cut a shallow spline/scallop shape (36) out from the top and bottom corners of the rigid material as shown in FIG. 19, where the shaded area is the material to be cut away, in accordance with the natural profile of the split tube (5). Such a cut (36) allows the screen panel (22) to follow the natural shape of the split tubes (5), thus resulting in a much straighter screen panel, held more taught in the vertical plane with fewer creases. It should be noted that the length of a zip half attached to the edge of a screen panel (22) does cover the entire top/bottom edge of the screen panel (22)—i.e. it does cover the spline/scalloped end as well as the predominant straight section.

As mentioned above, the present invention provides improvements to the arrangement disclosed in WO2010/109247 and features described therein can be used in connection with the present invention.

The invention claimed is:

1. A structure comprising:
   a. a frame comprising at least one split tube extendable member that is extendible between a rolled-up configuration and an extended configuration and
   b. a screen which can be rolled up with the split tube extendable member,
   wherein the split tube extendable member and the screen each comprises a half zip that are engaged with each other to releasably attach the screen to the split tube extendable member, wherein said half zips are stretchable to provide the same tooth spacing for the half zip attached to the split tube extendable member and the half zip attached to the screen.

2. A structure as claimed in claim 1, wherein the frame comprises a body for holding the split tube extendable member in the rolled-up configuration and a handle for supporting a free end of the split tube extendable member when it is extended.

3. A structure as claimed in claim 2, wherein in its rolled-up configuration, the split tube extendable member is in a flattened state rolled up in a coil, and in its extended configuration, at least part of the split tube extendable member is in a tubular state; the split tube extendable member being secured in its flattened state to the handle.

4. A structure as claimed in claim 3, wherein the screen has a cut-out where it is attached to the split tube extendable member in the region of the handle, to accommodate the region of the split tube extendable member when it changes from its flattened state where it is secured to the handle to its tubular state.

5. A structure as claimed in claim 1, wherein the frame comprises two split tube extendable members, one being attached to the top of the screen and the second being attached to the bottom of the screen.

6. A structure comprising:
   a. a frame comprising at least one split tube extendable member that is extendible between a rolled-up configuration and an extended configuration and
   b. a screen attached to the frame and having a convex side and a concave side when the split tube extendable member is in its rolled up configuration,
   wherein the split tube extendable member and the screen each comprises a half zip that are engaged with each other to attach the screen to the split tube extendible member, wherein teeth of each of the zip halves protrude towards one side of the zip half and wherein the zip halves are attached in such a way that the teeth of the zip halves protrude towards the convex side of the screen.

7. A structure as claimed in claim 6, wherein the frame comprises a body for holding the split tube extendable member in a rolled-up configuration and a handle for supporting a free end of the split tube extendable member when it is extended.

8. A structure as claimed in claim 7, wherein in its rolled-up configuration, the split tube extendable member is in a flattened state rolled up in a coil, and in its extended configuration, at least part of the split tube extendable member is in a tubular state; the split tube extendable member being secured in its flattened state to the handle.

9. A structure as claimed in claim 8, wherein the screen has a cut-out where it is attached to the split tube extendable member in the region of the handle, to accommodate the region of the split tube extendable member when it changes from its flattened state where it is secured to the handle to its tubular state.

10. A structure as claimed in claim 6, wherein the frame comprises two split tube extendable members, one being attached to the top of the screen and the second being attached to the bottom of the screen by said zips.

11. A structure comprising:
   a. a frame comprising an upper split tube extendable member and a lower split tube extendable member that are extendible between a rolled-up configuration and an extended configuration and
   b. a screen attached to the upper and lower split tube extendable members and that can be rolled up with the upper and lower split tube extendable members,
   wherein at least one rigid rod is attached to the screen that extends vertically along at least part of the distance between the upper and the lower split tube extendable members.

12. A structure as claimed in claim 11, wherein the at least one rod extends substantially the whole of the distance between the upper and the lower split tube extendable members.

13. A structure as claimed in claim 11, wherein the at least one rod overlaps with one or both of the upper split tube extendable member and the lower split tube extendable member.

14. A structure as claimed in claim 11, wherein the at least one rod has a profile that a user can grip to form a bend in the split tube extendable members and the screen.

15. A structure as claimed in claim 14, wherein the at least one rod has a T-shaped profile.

16. A structure as claimed in claim 11, wherein the frame comprises a body, for holding the split tube extendable members in a rolled-up configuration and
   a handle for supporting a free end of the split tube extendable members when they are extended.

17. A structure as claimed in claim 11, wherein in their rolled-up configurations, the split tube extendable members are in a flattened state rolled up in a coil, and in their extended configurations; at least part of the split tube extendable members are in a tubular state; the split tube extendable members being secured in their flattened states to the handle.

18. A structure as claimed in claim 17, wherein the screen has a cut-out where it is attached to the split tube extendable members in the region of the handle, to accommodate the region of the split tube extendable members when they change; from their flattened states where they are secured to the handle to their tubular states.

* * * * *